United States Patent Office

3,440,234
Patented Apr. 22, 1969

3,440,234
COMPLEXES, PROCESS FOR PREPARING THEM AND THEIR APPLICATIONS
Michel Asfazadourian and Marcel Prillieux, Mont-Saint-Aignan, France, assignors to Esso Research and Engineering Company, a corporation of Delaware
No Drawing. Filed June 10, 1965, Ser. No. 463,020
Int. Cl. C08f 27/02, 27/04
U.S. Cl. 260—91.7                                 2 Claims

ABSTRACT OF THE DISCLOSURE

Unsaturated hydrocarbons/metal halide complexes are prepared by reacting a halogenated hydrocarbon (an olefin or aromatic hydrocarbon) containing at least two halogen atoms with a metal carbonyl at a temperature within the range of 0° to 250° C. The resultant complex may be converted into an amorphous, crosslinked polymer by contacting the complex with water so as to dissolve the metal halide contained in the complex.

---

The present invention is concerned with new olefin/metal halide complexes, their preparation and their applications.

The complex compounds according to the invention have a structure which may be represented by one of the following formulae:

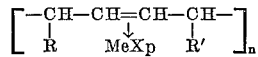

or

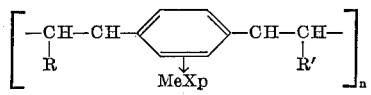

in which:
the side chains may occupy ortho, meta or para positions;
Me is a metal belonging to the Groups V, VI, VII or VIII of the Periodic Classification and capable of forming metal carbonyls;
$p$ is the valency of the metal Me;
X is a halogen;
$n$ is an integer preferably ranging from 1 to 5000; and
R and R' are hydrogen atoms, alkyl, alkylene, alkyl or alkylene-aryl groups which may or may not be halogenated.

The complex compounds according to the invention can be prepared by causing halogenated olefins or halogenated aromatic hydrocarbons to react with carbonyl metals in the presence of a solvent at a temperature ranging preferably from 0 to 250° C., and still more advantageously from 20° to 150° C. The reaction may be performed at atmospheric pressure or under increased pressure. Its length is generally a few hours. The product of the reaction may be precipitated in the reaction medium in the form of the unsaturated hydrocarbon/metal halide complex, which may be separated by filtration.

As the solvent, it is possible to use aromatic hydrocarbons, such as benzene, toluene, etc., gasoline fractions or mixtures of organic solvents.

According to the invention it is possible to use:

(a) Di- or poly-halogenated olefins in which two halogen atoms occupy either symmetrical positions in relation to the double bond ($\alpha\alpha'$, $\beta\beta'$, $\gamma\gamma'$, etc.), or contiguous positions in relation to the double bond ($\alpha\beta$, $\beta\gamma$, $\gamma\delta$, etc.). These olefins may, moreover, contain aromatic nuclei containing additional double bonds.

(b) Mono- or poly-cyclic di- or poly-substituted aromatic hydrocarbons having two or more halogen atoms, at least two of which are extra-nuclear.

The complex compounds according to the invention take the form of solids and are, in general, powders. They have in particular the following properties:

insolubility in organic solvents;
great resistance to heat.

Magnetic measurements show that these complexes are not paramagnetic.

The metal halide is linked to the organic part by a bond that is liable to be destroyed by polar solvents, by hydrolysis or by electronic bombardment.

Among the interesting applications of these complexes, we wish to mention in particular their conversion into amorphous polymers by mere contact with water, in which the metal halide is dissolved. These polymers are infusible, withstand heat up to 350° C. without decomposition and can be fritted at ambient temperature (15° to 20° C.) under high pressure (2000 bars). They are cross-linked (insolubility and infusibility). Their composition, expressed as percentages of constituents, corresponds to the unsaturated hydrocarbon structure; this structure corresponds to the organic molecule as may be ascertained in infra-red light.

EXAMPLE I

Various complexes according to the invention were prepared, starting from dichlorinated butenes and metal carbonyls.

The reaction was performed by heating for a varying number of hours at a pressure of 1 bar.

After filtering and drying, the various complexes were obtained in the form of fine powders.

Table I gives for the different complexes obtained the proportions of reagents and the conditions of the reaction:

TABLE I

| | Complexes | | |
|---|---|---|---|
| | A1 | A2 | A3 |
| Nature and Proportions of the Components of the Reaction: | | | |
| Solvent: | | | |
| Nature | Benzene | Benzene | Xylene. |
| Quantity | 1.000 ml | 1.000 ml | 1.000 ml. |
| Metal carbonyl: | | | |
| Nature | Ni(CO)₄ | Ni(CO)₄ | Fe(CO)₅. |
| Quantity | 1 mole | 1 mole | 1 mole. |
| Olefin: | | | |
| Nature | 1-4 dichlorobutene 2 | 3-4 dichlorobutene 1 | 1-4 dichlorobutene 1. |
| Quantity | 1 mole | 1 mole | 1 mole. |
| Conditions of the Reaction: | | | |
| Temperature, °C | 70 | 60 | 100/110. |
| Time, Hours | 2 | 2 | 38. |
| Yield in relation to dichlorobutene | 95 | 79 | 50. |
| Appearance of the Compound obtained | Fine red-brown powder | | Fine pale brown powder. |
| Structure of the complex | $\left[\begin{array}{c}-CH_2-CH=CH-CH_2-\\ \downarrow\\ NiCl_2\end{array}\right]_n$ | | $\left[\begin{array}{c}-CH_2-CH=CH-CH_2-\\ \downarrow\\ FeCl_2\end{array}\right]_n$ |

These different complex compounds were insoluble in organic solvents. In particular, unsuccessful attempts were made with pentane, hexane, heptane, cyclohexane, benzene, toluene, xylene, decaline, tetraline, $CCl_4$, $CH_3Cl$, $BrCH_3$, allyl bromide, acetone, dioxane.

When these complex compounds were heated in an enclosed vessel in an atmosphere of nitrogen they remained stable. On continuing to heat them regularly and slowly, it was found that they turned black at about 350° C. and considerable decomposition occurred.

The elementary analyses of complexes A1, A2, A3 confirmed that it is possible to attribute to these complexes the following raw formula: $(C_4H_6MeCl_2)_n$, Me representing Fe or Ni.

The value of $n$ cannot be determined, for the complex is not soluble in organic solvents. This latter property suggests that $n$ is at least equal to 1500, and may assume much higher values.

It has moreover, been possible to ascertain that in all cases, the two chlorine atoms are attached to the metal and not to the organic radical. By means of infra-red spectrometry it is nevertheless found that the organic chain may contain up to 2% of chlorine which has not reacted and there is a very small quantity of the functions $>C=O$.

EXAMPLE II

Under conditions similar to those of Example I, different complex compounds according to the invention were prepared, starting from metal carbonyls and aromatic hydrocarbons.

Table II gives, for the different complexes obtained, the proportions of the reagents and the conditions of the reaction.

TABLE II

| | Complexes | | | |
|---|---|---|---|---|
| | B1 | B2 | B3 | B4 |
| Nature and Proportions of the Components of the Reaction: | | | | |
| Solvent: | | | | |
| Nature | Benzene | p-Xylene | p-Xylene | p-Xylene. |
| Quantity (ml.) | 1.000 | 1.000 | 1.000 | 1.000. |
| Hydrocarbon: | | | | |
| Nature | $\omega\omega'$p.dichloro-xylene. | $\omega\omega'$p.dichloro-xylene. | $\omega\omega'$dichloroxylene | $\omega\omega'$p.dichloroxylene. |
| Quantity (mole) | 1 | 1 | 1 | 1. |
| Metal carbonyl: | | | | |
| Nature | $Ni(CO)_4$ | $Ni(CO)_4$ | $Ni(CO)_4$ | $Fe(CO)_5$. |
| Quantity (mole) | 1 | 1 | 1 | 1. |
| Conditions of the Reaction: | | | | |
| Temperature, ° C | 80 | 80 | 110/120 | 110/120. |
| Time, Hours | 8 | 8 | 20 | 10. |
| Yield in relation to dichloroxylene | 95 | 90 | 95 | 50. |
| Appearance | Fine powder | Fine powder | Fine powder | Fine powder. |
| Structure | $[-CH_2-\varphi-CH_2-]_n$ with $NiCl_2$ | $[-CH_2-\varphi-CH_2-]_n$ with $NiCl_2$ | | $[-CH_2-\varphi-CH_2-]_n$ with $FeCl_2$ |

These complex compounds were insoluble in the various solvents mentioned in Example I.

They were likewise very stable in relation to heat. It was possible for them to be heated up to 350° C., at which temperature they turned black without any discernible decomposition.

The elementary analyses showed that complexes B1, B2, B3 and B4 had the formulae given in Table II.

As in Example I, it was not possible to ascertain the value of $n$ owing to the insolubility of these complex compounds. The two chlorine atoms are attached to the metal.

EXAMPLE III

The various complex compounds A1, A2 and A3 of Example I were brought into contact with water. The complexes decomposed, the metal halide dissolving in water. Polymers corresponding to A1, A2 and A3 are thus obtained.

The hydrolysis was performed by washing the complexes with an excess of water until the metal halide had completely disappeared by dissolving. This was achieved by three washings in the cold. The polymers were separated by filtration, followed by drying in a vacuum; they took the form of finely-divided white powders.

The elementary analyses showed that these polymers complied with the general formula $(C_4H_6)_n$; it was not possible to ascertain the value of $n$, but it can be assumed that this value is the same as that of $n$ in the formula of the complex.

The polymers A1, A2 and A3 are practically identical compounds.

EXAMPLE IV

The complexes B1, B2, B3 and B4 of Example II were brought into contact with water. The complexes decomposed while the metal halide dissolved in water. Polymers corresponding to B1, B2, B3 and B4 were thus obtained.

When carried out under the same conditions as in Example III this treatment enabled these polymers to be obtained in the form of fine white powders.

The elementary analyses showed that these polymers complied with the general formula $(C_8H_8)_n$, $n$ having the same value as in the formulae of the complexes.

These polymers are practically identical compounds.

EXAMPLE V

The measurement of the resistivity of the polymers of Example III and Example IV furnished in all cases identical results:

at 300 Hz. cycles $\rho$ in the region of $10^{11}$ ohms/sq. cm./cm.; at 10,000 Hz. cycles $\rho$ greater than $10^6$ ohms/sq. cm./cm.

EXAMPLE VI

The polymers of Examples III and IV were heated in a closed vessel in an atmosphere of nitrogen. It was found that the polymers A1, A2, A3, B1, B2 and B4 could be heated to 350° C. without discernible decomposition.

On the other hand, the polymer B3 was less stable to heat than the other polymers; it started to decompose at 250° C. and as distinguished from the other polymers it had a softening point of about 220° C. which may facilitate some of its uses.

The present invention has only been described by way of some representative embodiments which should not be taken as limitations. Any useful modification of these embodiments may of course be made without departing from the scope of the invention.

What we claim is:

1. A process for preparing an amorphous, crosslinked polymer which comprises the steps of:
   (a) preparing an unsaturated hydrocarbon-metal halide complex by reacting a halogenated hydrocarbon with a metal carbonyl at a temperature in the range of 0° to 250° C., said halogenated hydrocarbon being selected from the group consisting of:
(1) halogenated olefins containing at least 2 halogen atoms and in which 2 of such halogen atoms occupy asymmetrical positions or symmetrical positions in relation to the double bond, and
(2) mono- or poly-cyclic aromatic hydrocarbons containing at least 2 halogen atoms in which at least 2 of such halogen atoms are extranuclear; and (b) contacting the complex obtained in step (a) with water so as to dissolve the metal halide contained in said complex.

2. An amorphous, crosslinked polymer prepared by the process of claim 1.

References Cited
UNITED STATES PATENTS
3,116,272  12/1963  Stewart et al. _____ 260—94.3

OTHER REFERENCES
Webb, I. D. and Borcherdt: Coupling of Allylic Halides by Nickel Carbonyl, in J. Am. Chem. Soc., vol. 73, pp. 2654 and 2655, June 1951.

JOSEPH L. SCHOFER, *Primary Examiner.*

JOHN A. DONAHUE, JR., *Assistant Examiner.*

U.S. Cl. X.R.

260—91.5, 92.1